UNITED STATES PATENT OFFICE.

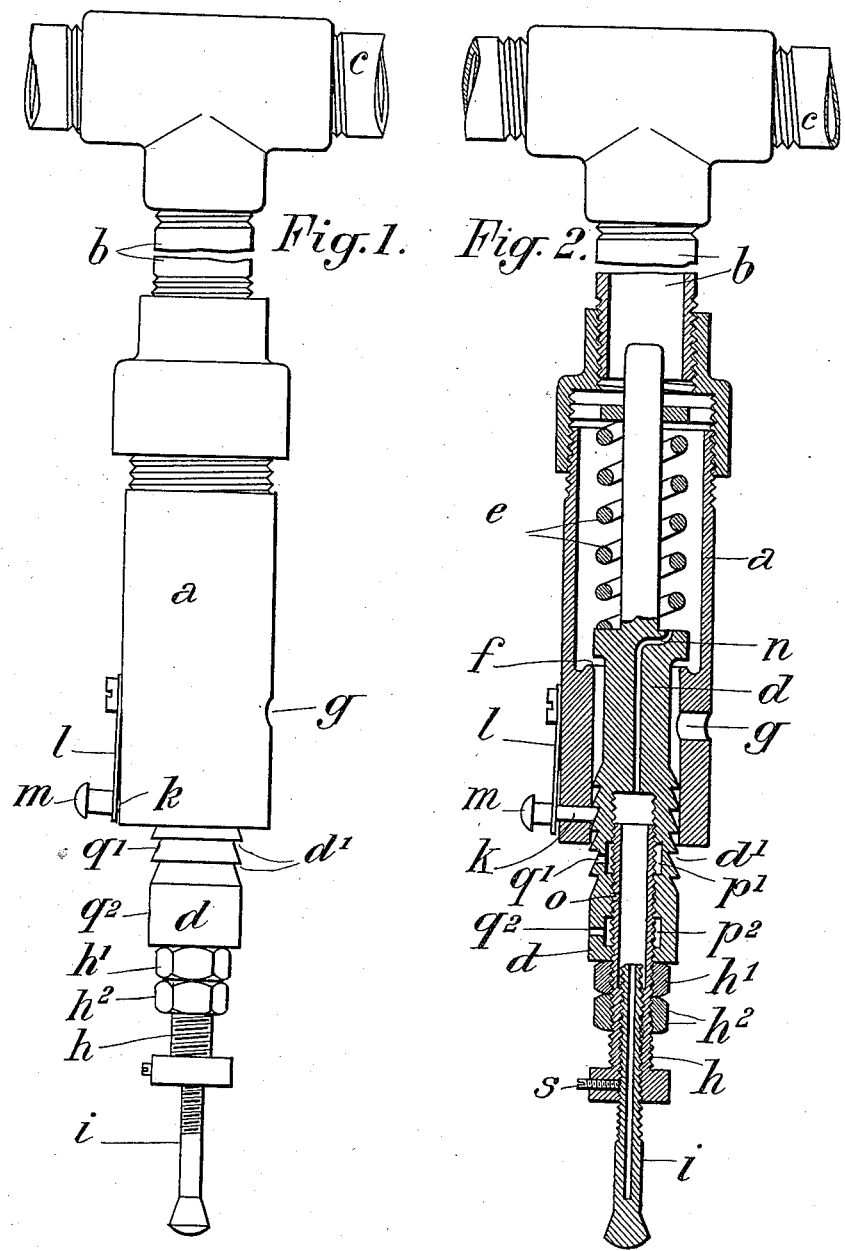

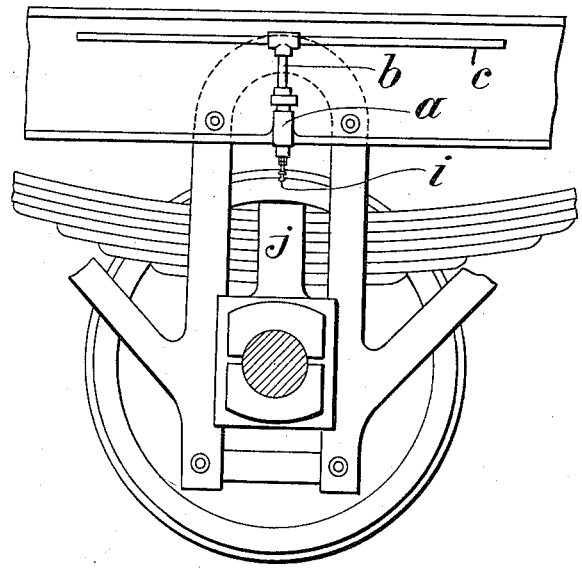

MAX CHOUMBROT, OF PARIS, FRANCE.

AUTOMATIC EMERGENCY-BRAKE.

1,023,623.  Specification of Letters Patent.  Patented Apr. 16, 1912.

Application filed August 5, 1911. Serial No. 642,446.

*To all whom it may concern:*

Be it known that I, MAX CHOUMBROT, a subject of the Russian Emperor, and resident of Paris, France, have invented certain new and useful Improvements in Automatic Emergency-Brakes, of which the following is a specification.

This invention relates to an apparatus which is intended to automatically cause the stopping of trains whenever an emergency occurs such as derailment, rupture of an axle, breakage of a tire or spring or any disturbance in the frame of a car or locomotive. Said apparatus comprises substantially a valve of a special construction which is in connection with the brake pipe and secured on a girder or on any other part of the car (or locomotive) above the axle or the lubricating box in such a manner that the valve stem is struck by said lubricating box or by an extension of said box, when an abnormal shock or any breakage happens, in which case said valve opens and causes the brakes to act. Said valve is arranged so as to be adjustable for being applied to every kind of cars and for avoiding all possibility of being put out of order through malevolence or through any other cause.

In the accompanying drawings: Figure 1 is a front elevation of my improved apparatus. Fig. 2 is a central vertical section. Fig. 3 shows the apparatus fixed upon a girder of a car frame.

The apparatus comprises a valve casing $a$ the top of which communicates through a connecting pipe $b$ with the brake pipe $c$ Fig. 3. Within said casing is placed a valve $d$ which is held under control of a coiled spring $e$ applying said valve on its seat $f$. If the valve is caused to raise, the interior of the casing $a$ and the brake pipe $c$ are put into communication with the exterior atmosphere through the aperture $g$, thus causing the application of the brakes.

Into the internally threaded hollow body of the valve $d$ is screwed a sleeve $h$ which is secured by means of a nut $h'$ and a check nut $h^2$ and which receives a threaded adjustable stem $i$. The casing $a$ being secured to the car, the length of the downwardly projecting portion of said stem $i$ is adjusted in such a manner that its lower end is at a small distance only above the lubricating box or any other part of the car which is directly participating in the movements of the axle, after which the stem $i$ is secured by means of a set screw $s$ into the sleeve $h$ in such a manner that said adjustment cannot be put out of order, neither accidentally nor malevolently.

If any strong shock occurs, or if a breakage of an axle, of a spring or of any other part causes the carframe and the lubricating box to come closer together, the stem $i$ is pushed upward together with the valve $d$, so as to produce the working of the brakes. The outer surface of the valve $d$ is provided with grooves $d'$ into which engages a pawl $k$ acted upon by a spring blade $l$, the object of said pawl being to prevent the valve $d$ from falling back after the cause of the valve's action has ceased. The pawl $k$ is provided with a button $m$ for conveniently disengaging said pawl from the grooves $d'$ to permit the valve to fall by gravity to normal position after repairs have been made. As stem $i$ could be broken off by accident or by malevolence and as the apparatus would thus be out of working order, in case of emergency; a special device has been provided for preventing this occurrence. The body of the stem $i$ is hollow and the cavity communicates with the interior of valve casing $a$ by means of a channel $n$ provided in the body of the valve $d$. If it happens that the stem $i$ breaks off, the air flows through the channel $n$ and the brakes are applied. The stem $i$ permits the adjustment of the apparatus for any kind of cars and locomotives. The threaded sleeve $h$ permits of slightly modifying the adjustment according to the circumstances in order that the apparatus will not act without any serious cause, $i.$ $e.$ at the slightest blow, for instance when the train runs over a switch or a crossing. Said regulation may be effected by slightly unscrewing the nuts $h'$ and $h^2$ and by somewhat unscrewing the sleeve $h$. But this corrective adjustment should not exceed a few millimeters. Indeed, to avoid the sleeve $h$ being displaced by malevolence or by any other reason in such a measure that the apparatus is no longer able to work said sleeve is provided with an aperture $o$. If the sleeve $h$ is in any undesired position, viz., too high or too low, said aperture coincides with one of the grooves $p'$, $p^2$ which are in communication with the atmosphere by means of the holes $q'$, $q^2$ and then the air escapes through the channel $n$ and causes the brakes to be applied.

Two distinct adjustments are provided one being effected only once for adapting the apparatus to any car on which it is to be secured, whatever may be the relative heights of axle and frame. This first adjustment, which is effectuated by means of the stem $i$, cannot be varied later on and does not admit of any change. The other adjustment consists in small variations or corrections and may be effected as desired; but thanks to the safety means the apparatus is provided with, the displacements corresponding to said last adjustment cannot be effected beyond suitable limits, not to be passed without producing an application of the brakes.

Having now fully described my said invention, what I claim and desire to secure by Letters Patent, is:

1. An apparatus for automatically applying the brakes in the event of an abnormal shock or the breakage of one of the car case supporting parts, comprising a valve the casing of which is secured on a vehicle and in communication with the brake pipes, an opening into the lateral surface of said casing, a slidable valve inside of said casing, a hollow valve rod connected to said valve by means of an interposed threaded sleeve, said valve rod extending downwardly so that its lower end is at a small distance above the lubricating box or the axle, in such a manner that in event of a violent shock the lubricating box or the axle strikes said valve rod which is pushed upward together with the valve thus connecting the interior of the casing with the atmosphere through the hole into the valve casing.

2. An apparatus for automatically applying the braking on the event of an abnormal shock or the breakage of one of the car case supporting parts, comprising a valve the case of which is secured on a vehicle and in communication with the brake pipe, an opening into the lateral surface of said casing, a slidable valve inside of said casing, a hollow valve rod connected to said valve by means of an interposed threaded sleeve, said valve rod extending downwardly so that its lower end is at a small distance above the lubricating box or the axle, and a set screw for securing said rod in adjusted position.

3. Apparatus for automatically applying the brakes on the event of an abnormal shock or the breakage of one of the car case supporting parts, comprising a valve the case of which is secured on a vehicle and in communication with the brake pipe, an opening into the lateral surface of said casing, a slidable valve inside of said casing, a hollow valve rod connected to said valve by means of an interposed threaded sleeve, said valve rod extending downwardly so that its lower end is at a small distance above the lubricating box or the axle, said rod being secured in its position by means of a set screw in such a manner that the adjustment cannot be put out of order accidentally nor by malevolence, the outer middle part of said valve being provided with grooves in which engages a spring controlled pawl preventing the valve from falling back after having been pushed in its raised position, said pawl being provided with a button for disengaging it, allowing the valve of falling back in its normal position.

4. An apparatus for automatically applying the brakes in the event of an abnormal shock or the breakage of one of the car case supporting parts comprising a valve the casing of which is secured on a vehicle and in communication with the brake pipe, an opening into the lateral surface of said case, a centrally perforated valve inside of said case, grooves on the outer surface of said valve, said grooves being engaged by a spring controlled pawl, a button for disengaging said pawl from the grooves, a hollow, downwardly extending valve rod connected to said valve by means of an interposed threaded sleeve, said rod being secured in its position on the sleeve by a set screw, an opening in said sleeve, said opening being located between two circular grooves disposed in the interior surface of the valve and communicating with the atmosphere so as to correspond to one of said grooves if it is displaced into an undesired position.

In testimony whereof I have hereunto set my hand in presence of two witnesses.

MAX CHOUMBROT.

Witnesses:
GASTON PETIAN,
H. C. COXE.

Copies of this patent may be obtained for five cents each, by addressing the "Commissioner of Patents, Washington, D. C."